US007076001B2

(12) United States Patent
Beadle et al.

(10) Patent No.: US 7,076,001 B2
(45) Date of Patent: Jul. 11, 2006

(54) SYSTEM AND METHOD FOR AN IN-SERVICE DECISION-DIRECTED SIGNAL TO NOISE RATIO ESTIMATOR

(75) Inventors: Edward R. Beadle, Melbourne, FL (US); John F. Dishman, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 855 days.

(21) Appl. No.: 09/977,362

(22) Filed: Oct. 16, 2001

(65) Prior Publication Data

US 2003/0072392 A1    Apr. 17, 2003

(51) Int. Cl.
*H04L 27/14* (2006.01)
*H04L 27/06* (2006.01)
*H04B 15/00* (2006.01)

(52) U.S. Cl. .................. 375/316; 375/343; 455/316

(58) Field of Classification Search ............. 375/147, 375/316, 343–344, 510; 329/306; 370/318, 370/335, 522; 455/316; 708/200, 320, 445
See application file for complete search history.

(56) References Cited

U.S. PATENT DOCUMENTS

| | | | |
|---|---|---|---|
| 4,835,790 A | | 5/1989 | Yoshida et al. |
| 5,157,694 A | | 10/1992 | Iwasaki et al. |
| 5,282,228 A | * | 1/1994 | Scott et al. ............... 375/344 |
| 5,440,582 A | | 8/1995 | Birchler et al. |
| 5,594,758 A | | 1/1997 | Petranovich |
| 5,640,431 A | * | 6/1997 | Bruckert et al. ............ 375/344 |
| 6,081,822 A | * | 6/2000 | Hillery et al. ............... 708/445 |
| 6,094,463 A | | 7/2000 | Stephens et al. |
| 6,111,921 A | | 8/2000 | Sudo et al. |
| 6,115,395 A | | 9/2000 | Norrell et al. |
| 6,219,095 B1 | | 4/2001 | Zhang et al. |
| 6,229,858 B1 | | 5/2001 | Stephens et al. |
| 6,292,519 B1 | * | 9/2001 | Popovic ..................... 375/346 |
| 6,717,976 B1 | * | 4/2004 | Shen ........................ 375/147 |
| 2002/0021749 A1 | * | 2/2002 | Lee et al. .................. 375/150 |
| 2002/0101832 A1 | * | 8/2002 | Chen et al. ................ 370/318 |

FOREIGN PATENT DOCUMENTS

| | | |
|---|---|---|
| WO | WO0070815 | 11/2000 |
| WO | WO0122623 | 3/2001 |

OTHER PUBLICATIONS

Matzner, Rolf & Englberger, Ferdinand, "An SNR Estimation Algorithm Using Fourth-Order Moments", 119, *IEEE* 1994.

Pauluzzi, David & Beaulieu, Norman, "A Comparison of SNR Estimation Techniques for the AWGN Channel", 1681-1691, *IEEE Transactions on Communications*, vol. 48, No. 10 Oct. 2000.

(Continued)

*Primary Examiner*—Kenneth Vanderpuye
*Assistant Examiner*—Lawrence Williams
(74) *Attorney, Agent, or Firm*—Duane Morris LLP

(57) ABSTRACT

A signal to noise ratio estimator and method for a received signal which includes a communication component and a noise component is disclosed. One embodiment is an in-service, blind, decision-directed estimator for a CPFSK communication signal. A preferred embodiment determines the power of a communication signal component by combining the received signal with a signal that is a delayed complex conjugate of the received signal and then removing the real component of the combined signal.

16 Claims, 1 Drawing Sheet

OTHER PUBLICATIONS

Lee, Jonghyun, Lee, ChongHyun, Chun, Joohwan, & Lee, Jong Huen, "Joint Estimation of the Space-Time Distributed Signal Parameters", http://sclab.kaist.ac.kr/publication/papers/conference/con_VTC2000fall_Joint . . . pdf.

Benedict, Thomas & Soong, T.T., "The Joint Estimation of Signal and Noise from the Sum Envelope", 447-454, *IEEE Transactions on Information Theory* vol. IT-13, No. 3 Jul. 1967.

Beaulieu, Norman, Toms, Andrew & Pauluzzi, David, "Comparison of Four SNR Estimators for QPSK Modulations", 43-45, *IEEE Communications Letters*, vol. 4, No. 2 Feb. 2, 2000.

Celandroni, Nedo, Ferro Erina && Potorti, Francesco, "Quality Estimation of PSK Modulated Signals", *IEEE Communications Magazine*, Jul. 1999.

Matzner, Rolf, "An SNR Estimation Algorithm for Complex Baseband Signals Using Higher Order Statistics", 41-52, Facta Universitatis (Nis) No. 6, 1993.

Matzner, Rolf, Englberger, Ferdinand, & Siewert, Ralf, Analysis and Design of a Blind Statistical SNR Estimator, http://speedy.et.unibw-muenchen.de/forsch/ut/publ/aes 10297.

* cited by examiner

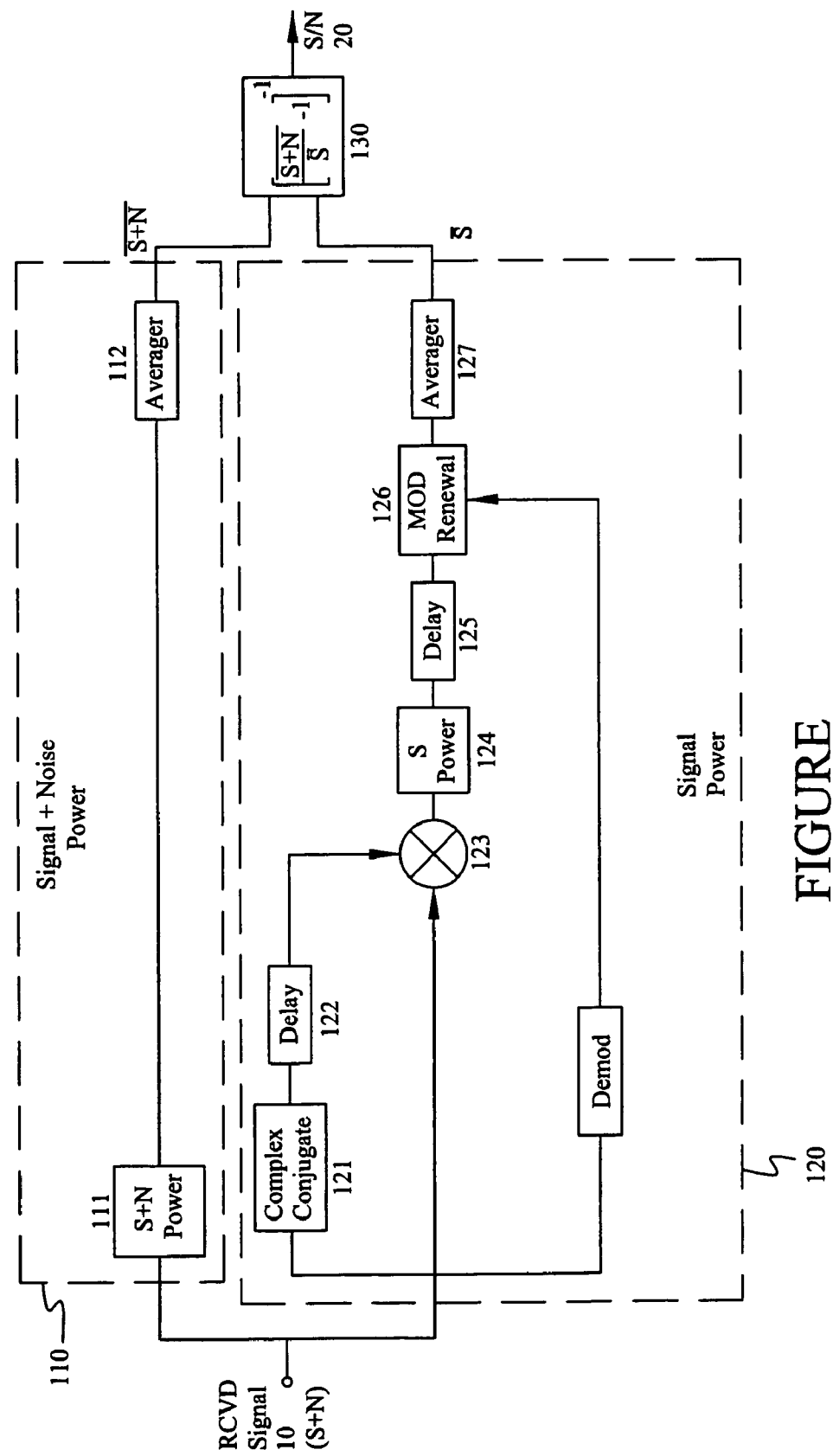

SYSTEM AND METHOD FOR AN IN-SERVICE DECISION-DIRECTED SIGNAL TO NOISE RATIO ESTIMATOR

The U.S. Government has a paid-up license in this invention and the right in limited circumstances to require the patent owner to license others on reasonable terms as provided for by the terms of DAAE30-96-C-0019 awarded by the Department of Defense.

BACKGROUND OF THE INVENTION

The present invention relates to signal to noise ratio ("SNR") estimators and methods for estimating the SNR of a received signal that includes a communication signal component and a noise component. The SNR estimate may be used to predict the bit error rate ("BER") of the communication signal being received.

Current state of the art SNR estimators typically operate only within a very narrow range of signal and/or equipment parameters and therefore are limited to systems of a particular design. Such systems may require a particular modulation type, a constant signal envelope, a training sequence of bits, a defined signal structure, an auxiliary channel to pass required information for the SNR estimate, a stationary baseband signal, a linear receiver, etc. Additionally, most prior art systems are too power-hungry, due to the large number and high complexity of mathematical operations required to be performed, to operate in battery-powered equipment for any reasonable length of time. While prior art systems work well within these tightly-defined design requirements, these systems do not work well, and some not at all, if the design requirements are not adhered to.

While the above requirements appear to allow for a prior art SNR estimator to meet any given set of parameters, there are some combinations of parameters that cannot be met by the current state of the art. For example, there is a need for an in-service SNR estimator to operate on a signal with a non-constant envelope, non-linear modulation with memory, in a low power system with a non-linear receiver, and without training sequences and without auxiliary channels. No known prior art SNR estimator will meet these requirements.

Examples of prior art SNR estimators include those discussed in a paper by Pauluzzi and Beaulieu ("Pauluzzi") entitled "A Comparison of SNR Estimation Techniques for the AWGN Channel" (IEEE Trans. on Comm., Vol. 438 No. 10, October 2000, pp. 1681–1691), the contents of which are hereby incorporated herein by reference. However, these systems are for baseband binary phase-shift keying ("PSK") signals in real Additive White Gaussian Noise ("AWGN") channels and use one or more of the following estimation techniques described in Pauluzzi to obtain an SNR estimate: split-symbol moment; maximum-likelihood; squared SNR variance; second-order and fourth-order moments; or signal to variation ratio. None of these systems will operate in a system with the afore-mentioned parameters.

A second paper, authored by Benedict and Soong ("Benedict") entitled "The Joint Estimation of Signal and Noise from the Sum Envelope", IEEE Trans. on Comm., Vol. IT-13 No. 3, July 1967, pp. 447–454, the contents of which are hereby incorporated herein by reference, describes a system for estimating SNR of an unmodulated sinusoid in an AWGN channel solely from envelope samples. The device disclosed in Benedict uses a maximum likelihood estimator in conjunction with a kurtosis method, which uses the second and fourth statistical moments. The Benedict device will not operate in a system with the afore-mentioned parameters.

A third paper, authored by Matzner and Englberger ("Matzner") entitled "An SNR Estimation Algorithm Using Fourth-Order moments", 1994 IEEE International Symposium on Information Theory, p. 119, the contents of which are hereby incorporated herein by reference, discloses an SNR estimating device which requires stationary signals and therefore will not operate in a system with the afore-mentioned parameters.

One embodiment of the present invention is an in-service, blind SNR estimator for a non-constant envelope, non-linear modulation signal with memory, in a low power system with a non-linear receiver, and operates without training sequences and without auxiliary channels. A blind estimator is one that has no knowledge of the signal being processed other than the signal's modulation while an in-service estimator derives an SNR estimate from the baseband, sampled, data-bearing received signal.

In another embodiment of the present invention, the problems of the prior art are avoided by estimating the SNR by a method which combines a signal power estimate with a signal-plus-noise power estimate. The signal-plus-noise power estimate may be obtained by time averaging the sum of the squares of the magnitudes of the power in the real (in-phase) and imaginary (quadrature) components of the received signal. The signal power estimate may be obtained by combining a demodulated bit sequence against samples of a delay discriminator output taken at an optimal sample time, and time averaging the result. The delay discriminator output may be produced by combining a time-delayed complex conjugate of the received signal with the received signal and then eliminating the real portion of the combined signal. The duration of the time delay may be less than the duration of a symbol in the received signal and may preferentially be approximately one-half of the symbol duration. The combining of the time-delayed complex conjugate signal and the received signal may be by any known means including, but not limited to, multiplication of the signals or correlation of the signals.

Although the above-described embodiment of the invention was designed to be used to meet the afore-mentioned parameters, the technique is not limited to those parameters but rather has applicability over a wide range of modulation formats, transmission channels, signal types, hardware constraints, etc. For example, nothing in the inventive system and method limits the applicability of the invention to any particular modulation format. The invention works with received signals modulated by formats including, but not limited to, frequency shift keying ("FSK"), constant-phase frequency shift keying ("CPFSK"), minimum shift keying ("MSK"), gaussian minimum shift keying ("GMSK"), phase shift keying ("PSK"), binary phase shift keying ("BPSK"), quaternary phase shift keying ("QPSK"), and quadrature amplitude modulation ("QAM"). The invention also operates with other modulation formats not mentioned above. Additionally, the invention is suitable for burst systems with non-constant envelopes.

The invention may be used in RF transmission systems such as satellite communication systems, cellular and PCS phones, software radios, local multipoint distribution systems ("LMDS"), multipoint multichannel distribution systems ("MMDS"), as well as fiber optic networks. Furthermore, the inventive SNR estimating technique can be used to determine communication link quality estimates for such applications as determining the bit error rate, power control, adaptive bit rate control, and fade detection. It is to be understood that the above-mentioned examples of modulation, transmission channels, and applications are exemplary only and are not intended to limit the invention or the applicability of the invention.

Accordingly, it is an object of the present invention to obviate many of the above problems in the prior art and to provide a novel system and method for an in-service decision-directed signal to noise ratio estimator.

It is another object of the present invention to provide a novel method for estimating the signal to noise ratio at a receiver of a transmitted signal having a modulated communication signal component including at least one data symbol and a noise signal component.

It is yet another object of the present invention to provide a novel method of estimating the SNR of a received signal having a modulated communication signal component and a noise signal component where the power of the received signal is compared with the power of the communication component of the received signal determined by a method including the step of combining the received signal with a delayed conjugate of the received signal.

It is still another object of the present invention to provide a novel SNR estimating method for a communication signal of either linear or non-linear modulation and either with or without memory.

It is a further object of the present invention to provide a novel SNR estimating method for either a constant envelope or non-constant envelope communication signal.

It is yet a further object of the present invention to provide a novel SNR estimating system and method for a communication signal modulated with any of the following modulation types: FSK, CPFSK, MSK, GMSK, BPSK, QPSK, or QAM.

It is still a further object of the present invention to provide a novel SNR estimating system and method where the power of the communication signal is derived from removing the real component of signal produced from the combination of the received signal and a delayed complex conjugate of the received signal.

It is an additional object of the present invention to provide a novel SNR estimating system and method where the power of the communication signal is derived from the imaginary component of signal produced from the combination of the received signal and a delayed complex conjugate of the received signal.

It is yet an additional object of the present invention to provide a novel SNR estimating system and method which operates in an in-service mode.

It is still an additional object of the present invention to provide a novel SNR estimating system and method which operates in a blind mode.

It is a further additional object of the present invention to provide a novel SNR estimating system and method which operates in a decision-directed mode.

These and many other objects and advantages of the present invention will be readily apparent to one skilled in the art to which the invention pertains from a perusal of the claims, the appended drawings, and the following detailed description of the preferred embodiments.

BRIEF DESCRIPTION OF THE DRAWING

The FIGURE is a block diagram of one embodiment of the invention showing the section for determining the communication signal-plus-noise signal power and the section for determining the communication signal power.

DESCRIPTION OF PREFERRED EMBODIMENTS

The invention estimates the SNR of a received signal which includes a communication signal and a noise signal. The communication signal includes plural symbols comprised of one or more bits. Each of the communication and noise signals may have a real and an imaginary component. Notionally, the invention estimates the SNR by the following equation:

$$SNR_{est} = \frac{\text{Signal } Power_{est}}{[\text{Signal} + \text{Noise } Power_{est} - \text{Signal } Power_{est}]}$$

The above notional equation may be expressed mathematically as:

$$SNR_{est} = \frac{E[\hat{b}_i \text{Im}(r_i(k)r_i^*(k-\tau))]}{|E[r_i(k)r_i^*(k)] - E[\hat{b}_i \text{Im}(r_i(k)r_i^*(k-\tau))]|}$$

where: E is the expectation operator;
$r_i(k)$ is the $k^{th}$ sample of the complex baseband received signal;
$r_i^*$ denotes the complex conjugate of the received signal;
$\hat{b}_i \in \{-1, +1\}$ is the $i^{th}$ demodulated bit;
$\tau$ is a free variable representing an amount of delay; for one embodiment of the invention, the value of $\tau$ is set such that $r_i(k)$ and $r_i(k-\tau)$ belong to the same bit;
Im denotes the imaginary component of the signal in the parentheses following the Im symbol.

As can be seen from the above mathematical equation, the SNR ratio may be determined by the use of well-known techniques including the expectation operator.

With reference now to the FIGURE, the received signal 10 includes a communication component ("S") and a noise component ("N"). The received signal 10 is applied to both the Signal+Noise Power block 110 and the Signal Power block 120. With reference directed to the Signal+Noise Power block 110, the received signal 10 is applied to the "S+N Power" block 111 where the power per bit of the received signal is determined. A method contemplated by the invention for determining the power per bit is to produce a signal derived from calculating the square of the amplitude of the real component of the received signal, the square of the amplitude of the imaginary component of the received signal, and then adding the squares of the real and imaginary components. The resultant signal is a function of the power per bit of the received signal. The output signal from the "S+N Power" block 111 is fed into the averager block 112 where a time average of the power per bit signals is determined over some predetermined number of bits. One embodiment of the invention contemplates using 512 bits, although the invention is operable for any predetermined number of bits used to take the average. However, one of the design trade-offs of the system is to balance the need to obtain a quick SNR estimate with the need to achieve an accurate estimate. As might be expected by one of skill in the art, fewer bits used in the average typically results in larger variances in the SNR ratio estimate while more bits used to determine the average typically results in smaller variances in the SNR ratio estimate. The output signal from the averager 112 is a function of the time averaged power of the received signal, shown as $\overline{S+N}$ in the FIGURE as the output of the Signal+Noise Power block 110.

Directing attention now to the Signal Power block 120 of the FIGURE, the received signal is applied to three blocks: the complex conjugate block 121, the combiner 123, and the demodulator block 128. The demodulator block 128 operates by any known means for demodulating the received signal 10 based on the type of modulation format of the received signal 10. The complex conjugate block 121 produces a complex conjugate signal of the received signal 10. The complex conjugate signal is then fed into the delay block 122 which delays the complex conjugate signal by a predetermined amount τ to produce a delay signal. One embodiment of the present invention adds a delay of less than a symbol duration of a symbol in the communication signal component of the received signal. Preferentially, the delay is approximately one-half the symbol duration.

The delay signal is then combined with the received signal, which has not been delayed, in the combiner 123 to thereby produce a combined signal. The combination may preferentially include a multiplication or a correlation of the delay signal and the received signal. The introduction of delay to the conjugate signal causes the imaginary component the combined signal to be non-zero. It is to be understood that the delay could be applied to the received signal, rather than the conjugate signal, prior to the received signal entering the combiner. As long as there is some relative lag between the complex conjugate signal and the received signal, the imaginary component of the combined signal will be nonzero and will have a known structure including the signal power estimate as well as multiplicative and additive bias terms. The value of the multiplicative bias term can be manipulated by varying the value of the delay in the delay block 122, i.e., varying the τ term in the mathematical equation above.

The combined signal is applied to the "S Power" block 124 where the real component of the combined signal is removed, thereby leaving the imaginary component of the combined signal. The imaginary component of the combined signal is representative of the power per bit in the communication component of the received signal. The imaginary component of the combined signal will include a term that is a function of the power per bit of the communication component of the received signal as well as additive bias terms that are nonzero due to the delay introduced between the conjugate signal and the received signal. The additive bias terms can be eliminated by any of a number of conventional techniques known to those of skill in the art. One such technique is to increase the number of bits used to determine the average in the averager 112 and the averager 127. The more bits included in the average, the less effect the additive bias terms will have on the SNR estimate. The afore-mentioned term that is a function of the power per bit of the communication component of the received signal will contain multiplicative bias, the effect of which can be nullified by conventional techniques known to those of skill in the art.

The output signal from the "S Power" block 124 is delayed in the delay block 125 typically by an amount equal to the delay induced by the demodulator 128 to thereby produce a delayed power-per-bit signal. The delayed power-per-bit signal from the delay block 125 is applied to the modulation removal block 126. As shown in the FIGURE, the output of the demodulator block 128 is used to remove the modulation from the delayed power-per-bit signal to thereby produce a demod power-per-bit signal. The demod power-per-bit signal is applied to the averager 127 which takes the average of the demod power-per-bit signal in a manner similar to the average taken by the averager 112 described above. The output signal from the averager 127 is a function of the time averaged power of the communication component of the received signal, shown as $\overline{S}$ in the FIGURE as the output of the Signal Power block 120.

The output of the Signal+Noise Power block 110, $\overline{S+N}$ is combined with the output of the Signal Power block 120, $\overline{S}$ in the block labeled 130. Preferentially, the $\overline{S+N}$ signal and the $\overline{S}$ signal are combined according to the following equation to thereby produce a signal $\overline{S/N}$ which is the estimate of the SNR:

$$\overline{S/N} = \left[\frac{\overline{S+N}}{\overline{S}} - 1\right]^{-1}$$

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What is claimed is:

1. A method for estimating a signal to noise ratio at a receiver of a transmitted signal having a modulated communication signal component including at least one data symbol and a noise signal component comprising the steps of:
    (a) receiving a transmitted signal having a real and an imaginary component;
    (b) sampling a predetermined attribute of the real component of the received signal to provide a first signal having a magnitude related to the attribute sampled;
    (c) sampling a predetermined attribute of the imaginary component of the received signal to provide a second signal having a magnitude related to the attribute sampled;
    (d) determining the power of the received signal from the first and second signals to provide a received power signal having a magnitude related to the power of the received signal;
    (e) producing a complex conjugate of the received signal to provide a conjugate signal;
    (f) delaying the conjugate signal by a predetermined length of time;
    (g) combining in a first predetermined manner the delayed conjugate signal with the received signal to thereby produce a combined signal;
    (h) sampling a predetermined attribute of an imaginary component of the combined signal to provide a communication power signal having a magnitude related to the power of the communication component of the received signal;
    (i) removing the modulation from the communication power signal; and
    (j) combining the received power signal and the communication power signal in a second predetermined manner to thereby provide an estimate of the signal to noise ratio of the transmitted signal.

2. The estimating method of claim 1 wherein the predetermined attribute in steps (b), (c), and (h) is energy.

3. The estimating method of claim 1 wherein the predetermined attribute in steps (b), (c), and (h) is power.

4. The estimating method of claim 3 wherein the predetermined length of time of delay in step (f) is less than a symbol duration.

5. The estimating method of claim 4 wherein the predetermined length of time of delay in step (f) is approximately one-half of the symbol duration.

6. The estimating method of claim 1 wherein the combining in the first predetermined manner in step (g) includes multiplication.

7. The estimating method of claim 1 wherein the step of removing modulation includes using an estimate of at least one data symbol.

8. The estimating method of claim 1 wherein the combining in the second predetermined manner in step (j) comprises the steps of:
  (1) averaging the received power signal over a predetermined number of symbols;
  (2) averaging the communication power signal over a predetermined number of symbols; and
  (3) taking the inverse of the sum of negative one plus the quantity of the average of the received power signal divided by the average of the communication power signal.

9. In a method for estimating a signal to noise ratio of a received signal having a real and an imaginary component where the received signal is representative of a transmitted signal having a communication signal component and a noise signal component, the improvement comprising the steps of:
  (a) determining the power of the received signal to provide a received power signal related to the power of the received signal;
  (b) producing a complex conjugate of the received signal to provide a conjugate signal;
  (c) delaying the conjugate signal by a predetermined length of time;
  (d) combining in a predetermined manner the delayed conjugate signal with the received signal to thereby produce a combined signal;
  (e) sampling a predetermined attribute of the imaginary component of the combined signal to provide a communication power signal having a magnitude related to the attribute sampled; and
  (f) combining the received power and communication power signals to thereby provide a signal related to an estimate of the signal to noise ratio of the received signal.

10. In a method for estimating a signal to noise ratio of a received signal having a real and an imaginary component of both a communication signal component and a noise signal component, where the power in the received signal is compared to the power in the communication component, the improvement including the steps of:
  (a) producing a complex conjugate of the received signal to provide a conjugate signal:
  (b) delaying the conjugate signal by a predetermined length of time; and
  (c) combining in a predetermined manner the delayed conjugate signal with the received signal to thereby produce a combined signal, and,
  (d)eliminating the real component of the combined signal to thereby provide a communication power signal representative of the power in the communication component of the received signal.

11. In a method for estimating a signal to noise ratio of a received signal having a real and an imaginary component of both a communication signal component and a noise signal component, where the power in the received signal is compared to the power in the communication component, the improvement including the step of eliminating the real component of the combination of the received signal and the delayed conjugate of the received signal.

12. A signal to noise ratio estimator comprising:
  receiving means for receiving a transmitted signal having a communication signal component and a noise signal component where the received signal has a real and an imaginary component;
  means for determining the power of the received signal to thereby provide a received power signal;
  means for producing a complex conjugate signal of the received signal;
  delaying means for delaying the complex conjugate signal for a predetermined duration;
  first combining means for combining the delayed complex conjugate signal and the received signal to thereby provide a combined signal;
    sampling means for determining an attribute of the imaginary component of the combined signal to provide a communication power signal having a magnitude related to the power of the communication component of the received signal; and
  second combining means for combining the received power signal and the communication power signal in a second predetermined manner to thereby provide an estimate of the signal to noise ratio of the transmitted signal.

13. The signal to noise estimator of claim 12 wherein the estimator operates in an in-service mode.

14. The signal to noise estimator of claim 12 wherein the estimator operates in a blind mode.

15. The signal to noise estimator of claim 12 wherein the estimator operates in a decision-directed mode.

16. In a method for estimating a signal to noise ratio of a received signal having a real and an imaginary component of both a communication signal component and a noise signal component where the signal to noise ratio estimate may be determined by combining a signal power estimate with a signal-plus-noise power estimate, the improvement including the steps of:
  producing the signal-plus-noise power estimate by time averaging the sum of the squares of the magnitudes of the power in the real and imaginary components of the received signal;
  producing the signal power estimate by combining a demodulated bit sequence of the communication signal component with samples of a delay discriminator output derived from the received signal taken at an optimal sample time to thereby produce a first signal, and
  time averaging the first signal.

* * * * *